United States Patent Office 3,535,079
Patented Oct. 20, 1970

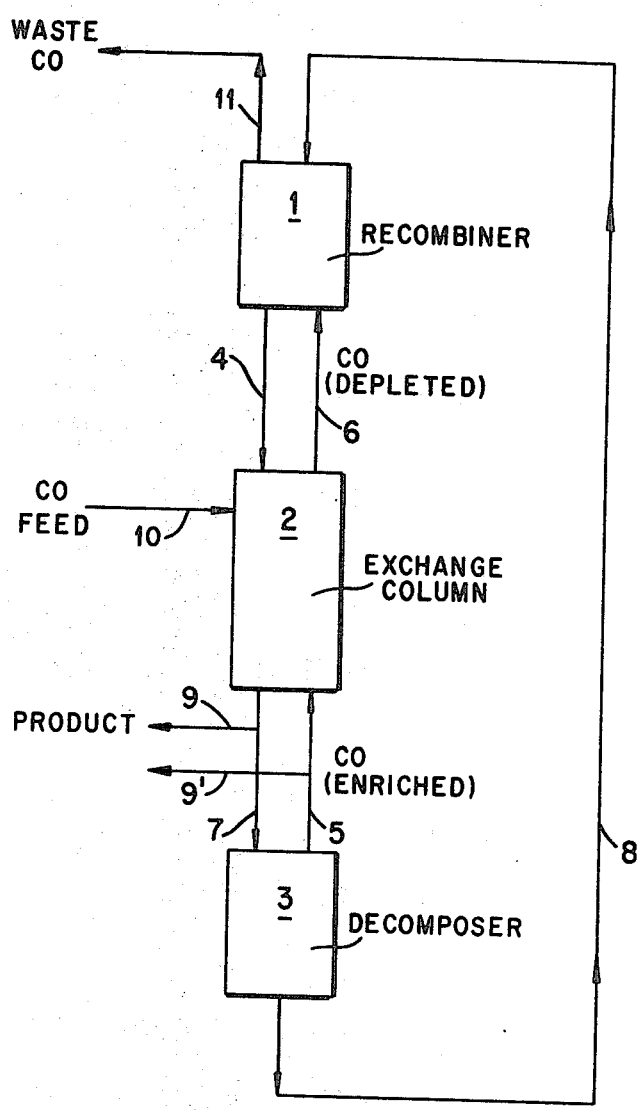

3,535,079
METHOD FOR FRACTIONATION OF CARBON ISOTOPES
Aloysius A. Palko, Oak Ridge, Tenn., assignor to the United States of America as represented by the United States Atomic Energy Commission
Filed Mar. 8, 1968, Ser. No. 711,746
Int. Cl. C01b *31/18;* C09k *3/00;* G21c *19/32*
U.S. Cl. 23—204                           4 Claims

ABSTRACT OF THE DISCLOSURE

A two-phase chemical exchange process for the fractionation of carbon isotopes is provided by contacting an aqueous solution of cuprous chloride and ammonium chloride-carbon monoxide complex with carbon monoxide to exchange carbon-13 in the gas phase with carbon-12 in the liquid phase and thereafter thermally dissociating the complex to yield carbon monoxide enriched with carbon-13.

BACKGROUND OF THE INVENTION

The invention described herewith was made in the course of, or under, a contract with the U.S. Atomic Energy Commission. It relates generally to methods for separating isotopes and more particularly to a fractionation method for the separation of carbon isotopes.

Previously, carbon isotopes were conventionally separated by low temperature distillation of carbon monoxide or by thermal diffusion of methane or carbon monoxide. Carbon isotopes obtained by either of these methods were expensive due to the low efficiency and small volumes of materials which could be processed. It has been known that certain copper solutions, such as cuprous chloride, would dissolve carbon monoxide from which, theoretically, the enrichment in a particular isotope should be achieved. Experience with copper solutions in the presence of carbon monoxide has revealed certain inherent deficiencies, e.g., the copper compound decomposed to deposit copper metal; the carbon monoxide could not be regenerated from the complex; or the carbon monoxide was partially converted to carbon dioxide. It is essential that more than 99.99% of the carbon monoxide complexed with the copper compound be regenerated since this step occurs at the product end of the process. It is therefore desirable to provide a fractionation method for separating carbon isotopes employing an aqueous solution which will preferentially complex carbon isotopes without decomposition of the complex but which will readily yield the desired fractionated carbon isotope.

SUMMARY OF THE INVENTION

The primary object of this invention is accomplished by the discovery that an aqueous solution of cuprous chloride-ammonium chloride-carbon monoxide complex preferentially complexes carbon-13 without decomposition and readily yields carbon monoxide enriched in the carbon-13 isotope upon subsequent thermal dissociation of the complex. Equilibrium constants for the over-all exchange reaction $(^{13}CO/^{12}CO)_{complex}/(^{13}CO/^{12}CO)_{CO}$ are 1.014 at 24° C. and 1.016 at 20° C. Employing a chemical exchange process, an aqueous solution of cuprous chloride and ammonium chloride was found to rapidly absorb carbon monoxide to form a complex which when contacted with carbon monoxide in an exchange type reaction exchanged $^{12}CO$ in the aqueous for $^{13}CO$ in the gas phase. Upon gentle heating to 85° C., the complex readily dissociated to regenerate carbon monoxide enriched in the carbon-13 isotope. The process is readily amenable to a thermal refluxing process with all of the components being recombined and recycled without loss of reactants.

BRIEF DESCRIPTION OF THE DRAWING

The sole drawing shows a block diagram of the various stages of the subject process comprising a recombiner 1 wherein the aqueous cuprous chloride-ammonium chloride-carbon monoxide complex is formed; an exchange column 2 wherein the aqueous complex is enriched with respect to the carbon-13 isotope; and a decomposer 3 wherein the carbon-13 enriched aqueous complex is thermally dissociated to yield carbon monoxide enriched with respect to the carbon-13 isotope and an aqueous cuprous chloride-ammonium chloride solution.

DESCRIPTION OF THE PREFERRED EMBODIMENT

While the invention is not limited to a continuous process, it will hereinafter be described with respect to a thermal refluxing process which operates in continuous fashion wherein cuprous chloride and ammonium chloride are combined with carbon monoxide to form a complex, the complex is contacted with carbon monoxide in an exchange column to exchange the $^{12}CO$ of the complex with the $^{13}CO$ in the gas phase and subsequently heated to dissociate the $^{13}CO$ enriched complex to yield the $^{13}CO$ enriched product.

Referring to the drawing, recombiner 1 is provided to facilitate the formation of the aqueous cuprous chloride-ammonium chloride-carbon monoxide complex, hereinafter referred to as a cuprous complex solution, by combining a cuprous chloride-ammonium chloride solution with carbon monoxide. This reaction proceeds as follows:

$$Cu_2Cl_2 \cdot 8NH_4Cl + CO \rightarrow Cu_2Cl_2 \cdot 8NH_4Cl \cdot CO \quad (1)$$

For this the $Cu_2Cl_2$ and $NH_4Cl$, for example, combined in a mole ratio of 1:8, rapidly absorbed carbon monoxide, providing Cu/CO ratios of 2 at 20° C. and 4 at 30° C. (at atmospheric pressure). The $Cu_2Cl_2/NH_4Cl$ mole ratio may vary over a wide range; compositions having mol ratios in the range of 1:4 to 1:12 are quite suitable, with a mole ratio of 1:8 being preferred (i.e., 1 $Cu^+$ to 4 $NH_4Cl$).

The cuprous complex solution flows from the recombiner 1 through line 4 to the exchange column 2, which is filled with a suitable packing material (e.g., ceramic glass packing rings) to increase the surface area of the cuprous complex. There the cuprous complex solution contacts carbon monoxide countercurrently to exchange the $^{12}CO$ of the complex with the $^{13}CO$ in the gas phase. The chemical exchange reaction is postulated to proceed according to the following reaction:

$$Cu_2Cl_2 \cdot 8NH_4Cl \cdot {}^{12}CO(l) + {}^{13}CO(g) \rightleftharpoons$$
$$Cu_2Cl_2 \cdot 8NH_4Cl \cdot {}^{13}CO(l) + {}^{12}CO(g) \quad (2)$$

After the chemical exchange is completed the cuprous complex solution which is enriched in the carbon-13 isotope passes to the decomposer 3 through line 7. The decomposer 3 is maintained at a temperature of at least 85° C., preferably about 100° C., so as to effect complete dissociation of the cuprous complex solution and effecting separation of the cuprous chloride and ammonium chloride solution from the carbon monoxide which is enriched in the carbon-13 isotope. This reaction proceeds as follows:

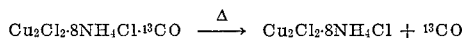
$$Cu_2Cl_2 \cdot 8NH_4Cl \cdot {}^{13}CO \xrightarrow{\Delta} Cu_2Cl_2 \cdot 8NH_4Cl + {}^{13}CO$$

The cuprous chloride-ammonium chloride solution which contains generally below about 10 p.p.m. CO is recycled through line 8 to the recombiner 1. The carbon-13 enriched CO stream from decomposer 3 enters the bottom of column 2 by way of line 5, progresses through exchange column 2 to the recombiner 1 by way of line 6. A waste stream, depleted with respect to $^{13}CO$, is removed from the recombiner 2 by outlet 11. The product $^{13}CO$ may be obtained at the bottom of column 2 as the cuprous complex solution by way of line 9 or as the enriched $^{13}CO$ gas phase by line 9'. A feed stream 10 is fed to the column 2 at a point selected as having the same isotopic concentration as the feed material. The feed is sufficient to balance the material being removed from the system as waste and product.

While the pH of the aqueous solution may vary widely, a pH less than 6 must be maintained throughout the system. A pH of 1–2 is preferable and can be conveniently adjusted by addition of HCl.

Because the cuprous complex solution can be readily formed in the recombiner and subsequently dissociated with gentle heating to regenerate the $^{13}CO_2$ absorbed, the process is readily adaptable to thermal refluxing. In the following examples, a prototype carbon isotope separation system was operated under total reflux to study its operating characteristics and demonstrate the utility thereof.

EXAMPLE I

A carbon isotopes separation system designed to operate in accordance with the present invention utilized a glass exchange column 6 ft. long by ¾ in. diameter packed with ⅛ in. glass helices. A recombiner was fabricated of 1 in. ID glass pipe 3 ft. long packed with glass helices. The decomposer was fabricated of 1½ in. ID glass pipe 3 ft. long also packed with glass helices. The decomposer was equipped with a heated cuprous complex solution reservoir maintained at about 100° C. and a condenser for reducing the CO gas temperature back to the column temperature prior to its return to the column. The components of the system were connected by means of ¼ in. ID polyethylene tubing.

Cuprous complex solution from the recombiner was fed to the exchange column at the rate of 250 cc./hour. The column temperature was maintained at 23° C. While the system operated under conditions of total reflux, specimens were taken from the top and bottom of the exchange column as well as from the aqueous effluent from the decomposer. Isotopic analysis of the exchange column specimens showed that a total separation, $\Sigma$, of 2.26 was attained in 48 hours, i.e., $$\Sigma = \frac{^{13}C/^{12}C \text{ bottom of column}}{^{13}C/^{12}C \text{ top of column}} = 2.26$$

Dissociation of the cuprous complex solution was more than 99.99% complete. The aqueous cuprous chloride-ammonium chloride effluent from the decomposer was found to contain as little as 1 p.p.m. CO and typically less than 10 p.p.m. CO.

EXAMPLE II

In another run using the same column described in Example I, cuprous complex solution was fed to the exchange column at the rate of 650 cc./hour. Equilibrium conditions were achieved in 48 hours and a total separation, $\Sigma$, of 1.5 was attained.

What is claimed is:
1. A method for fractionating the isotopes of carbon comprising the steps of
   (a) contacting an aqueous solution of a cuprous chloride and ammonium chloride-carbon monoxide complex maintained at a pH less than 6 with CO gas to thereby exchange carbon-12 in the liquid phase with carbon-13 in the gas phase; and
   (b) thereafter thermally dissociating said complex to yield CO gas enriched in carbon-13.
2. The method of claim 1 wherein said solution is maintained at pH of 1–2 and said thermal dissociation step is effected at a temperature of at least 85° C.
3. The method of claim 1 wherein said cuprous chloride and ammonium chloride are combined in a mole ratio within the range of 1:4 to 1:12.
4. The method of claim 1 wherein the equilibrium constant for the over-all exchange reaction is 1.016 at 20° C.

References Cited

UNITED STATES PATENTS 3,415,615   12/1968   Blytas et al. _____ 23—204

FOREIGN PATENTS 1,099,504   2/1961   Germany.

EARL C. THOMAS, Primary Examiner

H. S. MILLER, Assistant Examiner

U.S. Cl. X.R.

23—270; 252—301.1; 264—0.5